Oct. 30, 1962  D. R. MACK  3,060,743
LINEARIZED MEASURING DEVICE
Filed April 13, 1959  3 Sheets-Sheet 1
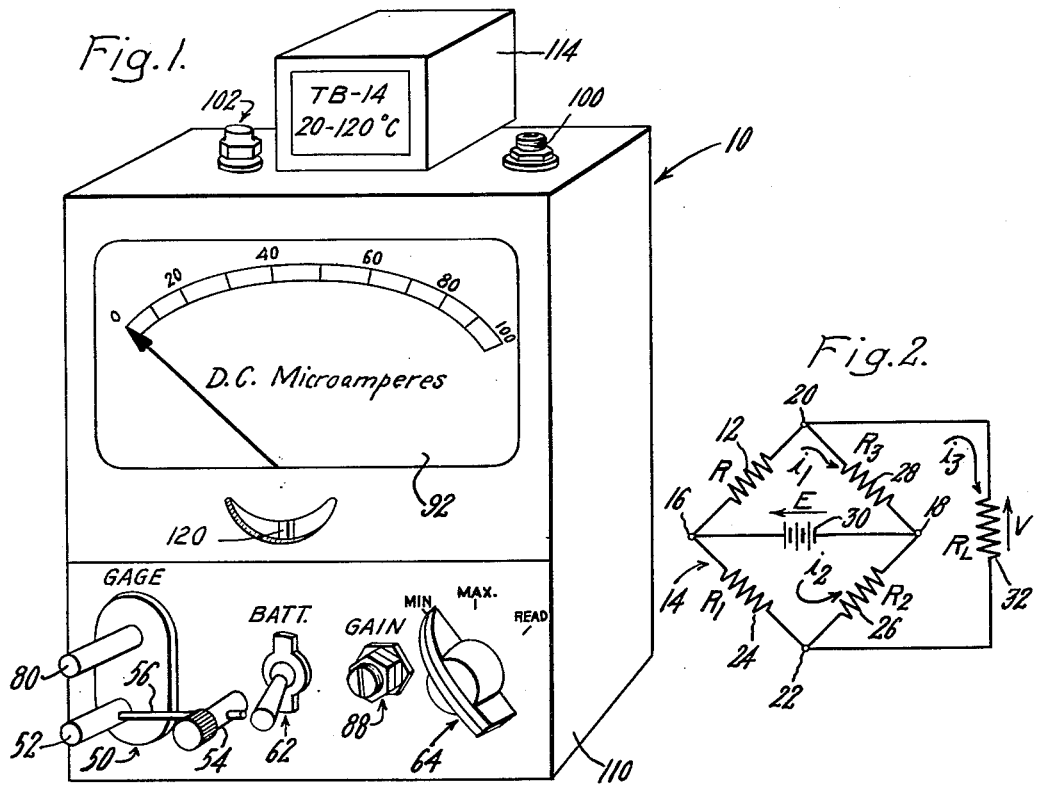
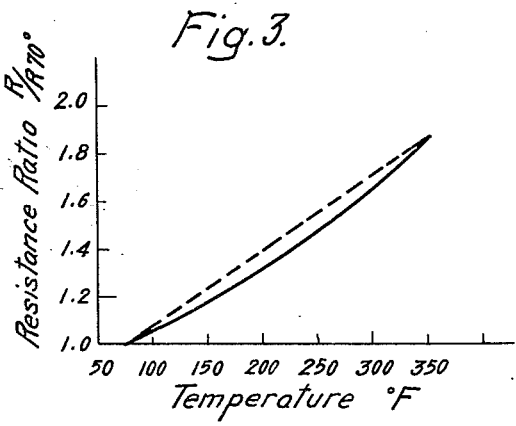
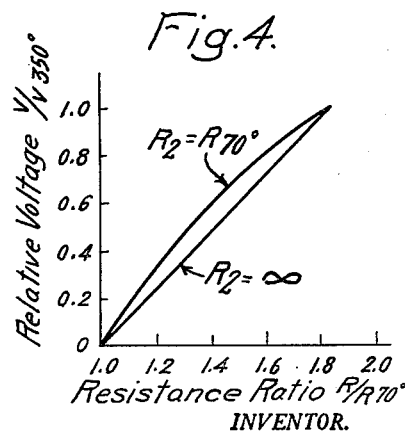
INVENTOR.
DONALD R. MACK
BY
HIS ATTORNEYS Oct. 30, 1962  D. R. MACK  3,060,743
LINEARIZED MEASURING DEVICE
Filed April 13, 1959  3 Sheets-Sheet 3

INVENTOR.
DONALD R. MACK
BY
Pringley, Bard, Clayton, Miller & Boyel
HIS ATTORNEYS ns of the Water Patent Office 3,060,743
Patented Oct. 30, 1962

3,060,743
LINEARIZED MEASURING DEVICE
Donald R. Mack, Schenectady, N.Y., assignor to General Electric Company, a corporation of New York
Filed Apr. 13, 1959, Ser. No. 806,058
4 Claims. (Cl. 73—362)

This invention relates to measuring devices in which the output is a linear function of the character being measured and particularly to a linearized temperature measuring device.

The present invention is particularly useful when incorporated in a temperature measuring device and, accordingly, the invention will be discussed when so applied although it will be clear to those skilled in the art that the invention can be utilized equally well in other measuring devices. There are available on the market resistance temperature gages which are small grids of nickel wire adapted to be glued on the surface of which the temperature is to be measured. The resistance of the resistance temperature gages is a function of temperature over a given operating range; however, the resistance of the gage is not a linear function of temperature, the resistance gages ordinarily having a positive temperature coefficient. Accordingly, the manufacturer provides a table in which the resistance value of the gage at a plurality of temperatures is set forth. Ordinarily, the resistance temperature gage is placed in a Wheatstone bridge circuit which is utilized to measure the resistance of the gage after which the temperature can be determined by reference to the resistance vs. temperature table for the particular resistance temperature gage being used. This temperature measuring procedure is accurate but tedious since it requires two manual operations, namely, balancing the Wheatstone bridge manually and thereafter manually looking up the temperature in the resistance vs. temperature table for the gage.

Other attempts have been made to provide a direct reading instrument whereby to eliminate the necessity to consult the resistance vs. temperature table when taking each reading, but these efforts have not been successful heretofore due at least in part to the fact that the output voltage of the Wheatstone bridge is also a non-linear function of the resistance of the temperature sensing gage. In an effort to simplify the operation of the Wheatstone bridge circuit it has been customary heretofore to choose the dummy resistors in the Wheatstone bridge either for maximum bridge output voltage or to have a conveniently obtainable resistance value therefor such as 1,000 ohms, or to provide dummy resistors having a resistance equal to the compensating resistor, the last mentioned alternative providing an instrument in which the input and output terminals of the Wheatstone bridge are interchangeable. However, none of the choices provides a measuring device in which the voltage output of the Wheatstone bridge is a linear function of the temperature being measured.

Accordingly, it is an important object of the present invention to provide an improved measuring device and particularly an improved temperature measuring device which permits the direct reading and/or the direct recording of the temperature being measured on a linear scale.

Another object of the invention is to provide a temperature measuring device utilizing a simple circuit of the Wheatstone bridge type in which the voltage output of the Wheatstone bridge circuit is a linear function of the temperature being measured whereby to permit direct reading and/or recording of the temperature on a linear scale.

Still another object of the invention is to provide a temperature measuring device utilizing the improved Wheatstone bridge of the present invention in which the output voltage of the bridge can be calibrated in terms of temperature on a linear scale quickly and accurately.

Yet another object of the invention is to provide a temperature measuring device of the type set forth in which the temperature sensing resistance gages can be quickly interchanged and the reading scale of the device readily recalibrated to accommodate a new and different temperature sensing resistance gage.

Further features of the invention pertain to the particular arrangement of the parts, whereby the above outlined and additional operating advantages and features thereof are attained.

The invention, both as to its organization and method of operation, together with further objects and advantages thereof, will best be understood by reference to the following specification taken in connection with the accompanying drawings, in which:

FIGURE 1 is a perspective view of a temperature measuring device made in accordance with and embodying the principles of the present invention;

FIG. 2 is a simplified schematic electrical diagram of the Wheatstone bridge circuit forming a part of the temperature measuring device of this invention;

Figure 5:
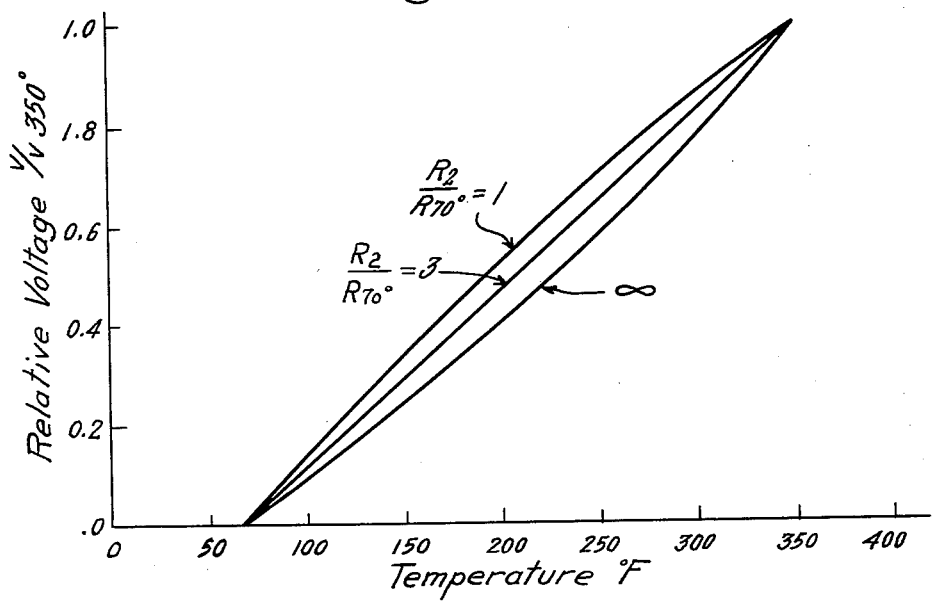
Figure 6:
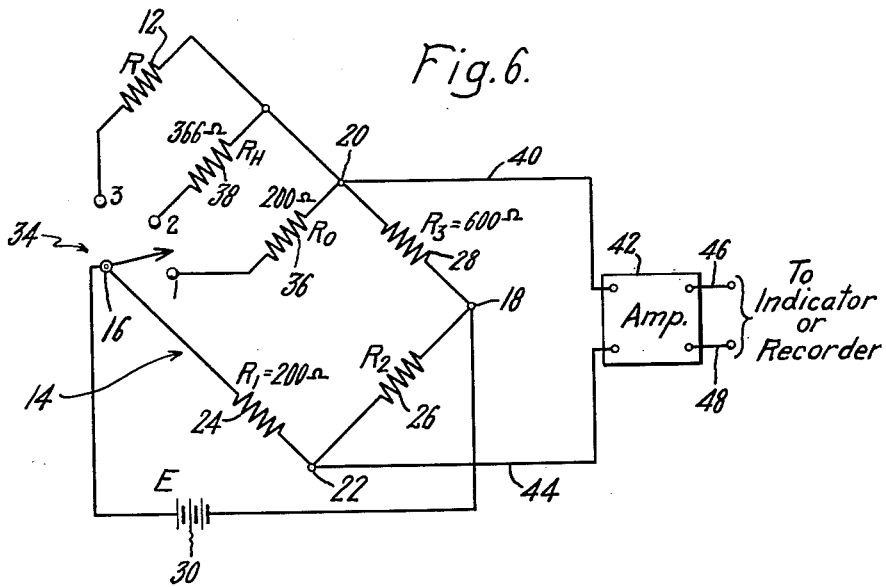
Figure 7:
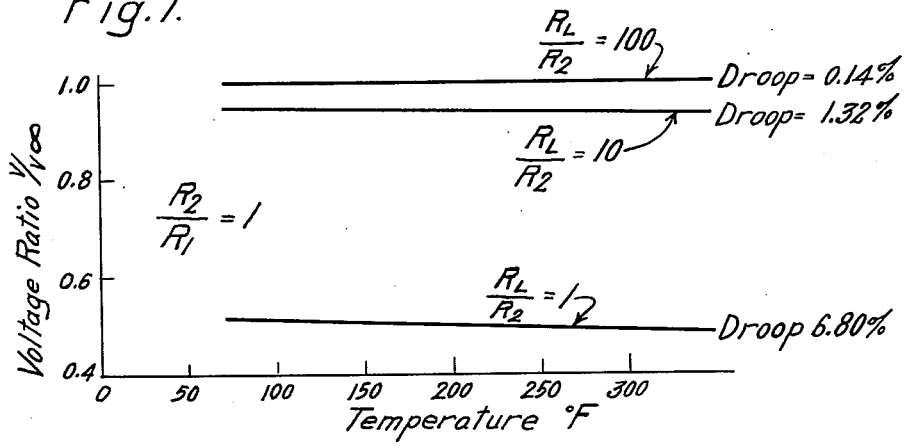
Figure 8:
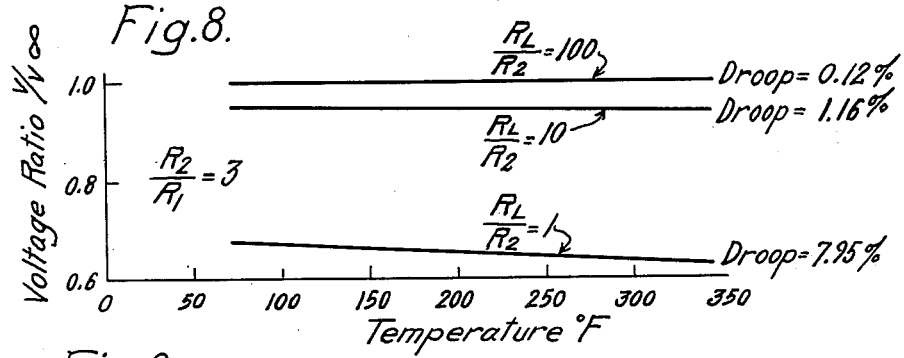
Figure 9:
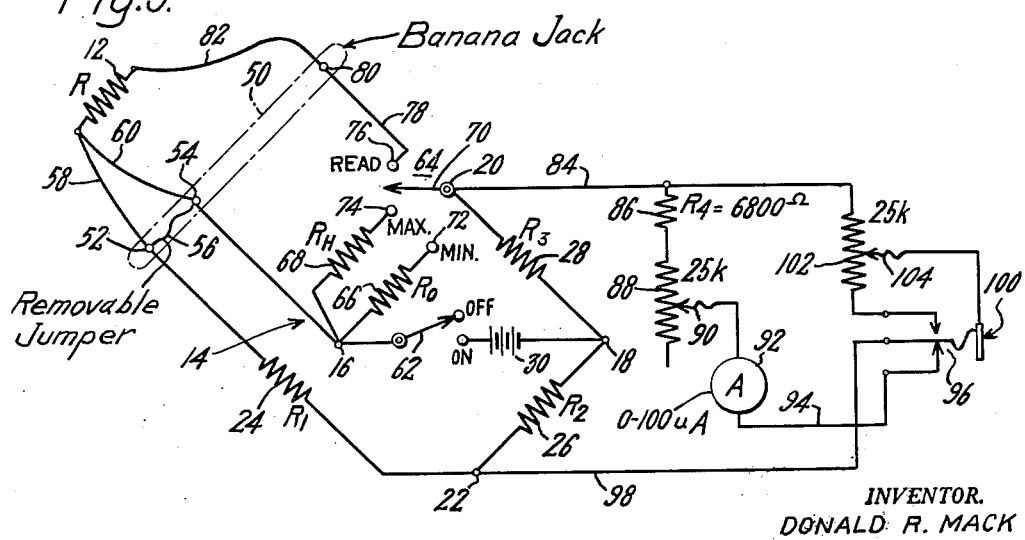

FIG. 3 is a graph plotting the relationship between temperature and the "Resistance Ratio" for a typical temperature measuring gage forming a part of the measuring device of the present invention, the Resistance Ratio being the ratio of the resistance of the gage at the temperature being measured to the resistance of the gage at the lower end of the temperature range being measured, the curves illustrating that the relation between the resistance of the gage and the temperature being measured is a non-linear function over the temperature range being measured;

FIG. 4 is a graph plotting the "Relative Voltage" against the "Resistance Ratio," the Relative Voltage being the ratio of the output voltage of the Wheatstone bridge at the temperature being measured to the output voltage at the upper end of the temperature range being measured, the Resistance Ratio being the ratio of the resistance of the resistance temperature gage at the temperature being measured to the resistance thereof at the low end of the temperature range to be measured, the curve showing the effect of changing the resistance value of the dummy resistors in the Wheatstone bridge circuit and that the output voltage is a non-linear function of the gage resistance except when the value of the dummy resistors is infinite;

FIG. 5 is a graph plotting the "Relative Voltage," namely the ratio of the voltage output of the Wheatstone bridge at the temperature being measured to the output voltage at the high end of the temperature to be measured, against the temperature being measured, and showing the effects of changing the value of the dummy resistors in the Wheatstone bridge circuit;

FIG. 6 is a schematic electrical diagram illustrating another circuit embodying the principles of the present invention;

FIG. 7 is a graph plotting the relationship between temperature and the "Voltage Ratio" for a circuit wherein the ratio between the resistance of the dummy resistors and the compensating resistors is one, the Voltage Ratio being the ratio between the output voltage of the Wheatstone bridge at the temperature being measured with a finite load resistance across the output terminals of the Wheatstone bridge and the voltage when the load resistance is infinite, curves being presented for different values of the ratio between the load resistance across the output terminals of the Wheatstone bridge and the dummy resistors;

FIG. 8 is a graph similar to the graph of FIG. 7 for a circuit wherein the ratio between the dummy resistors and the compensating resistor is the optimum value for linearizing the output of the temperature measuring device; and FIG. 9 is an electrical schematic diagram illustrating another form of circuit embodying the principles of the present invention.

There is shown in FIG. 1 of the drawings a temperature measuring device 10 embodying therein the principles of the present invention. The measuring device 10 is adapted to be used in combination with a temperature sensing resistor 12 which may be in the form of a resistance temperature gage formed as small grids of nickel wire and adapted to be glued on the surface which is to have the temperature thereof measured. Specific examples of suitable gages which can be used as the temperature sensing resistor 12 are the resistance temperature gages sold by the Baldwin-Lima-Hamilton Company of Waltham, Massachusetts and designated as gages T–7, T–14 and TB–14 and those manufactured by the Arthur C. Ruge Associates, Inc. of Cambridge, Massachusetts and designated types PN–1, PN–2, BN–3 and BN–4. The resistance of such gages, depending upon the type, is between 50 and 200 ohms at 70° F. and the manufacturer furnishes a table of resistance vs. temperature for each type of resistance temperature gage. The resistance is a non-linear function of temperature and for example in the case of Baldwin gages T–7, T–14 and TB–14, the resistance characteristic exhibits a positive temperature coefficient and deviates 13.5° from a straight line over the operating range 70° F. to 350° F. There has been plotted in FIG. 3 of the drawings a typical resistance vs. temperature characteristic for the Baldwin gages T–7, T–14 and TB–14; more specifically, the "Resistance Ratio" has been plotted against temperature, the Resistance Ratio being the ratio between the resistance of the gages at the temperature being measured and the resistance of the gages at 70° F., that plot being illustrated by solid lines therein. A theoretical straight line function of the "Resistance Ratio" vs. temperature over the range 70° F. to 350° F. is indicated by the dashed line.

In accordance with the principles of the present invention, the resistance temperature gage 12 is connected in a Wheatstone bridge circuit 14 having a pair of input terminals 16 and 18 and a pair of output terminals 20 and 22. The resistance temperature gage 12 is inserted between the input terminal 16 and the output terminal 20 and a compensating resistor 24 is connected between the first input terminal 16 and the second output terminal 22. A pair of dummy resistors 26 and 28 is provided, the dummy resistor 26 being connected between the second input terminal 18 and the second output terminals 22 and the dummy resistor 28 being connected between the second input terminal 18 and the first output terminal 20. A battery 30 is connected between the input terminals 16 and 18 to provide the necessary operating potentials for the bridge 14. It is preferred that the compensating resistor 24 have a resistance $R_1$ which is equal to the resistance R of the resistance temperature gage 12 at the lower end of the temperature range to be measured. The resistance value $R_2$ of the resistor 26 and the resistance value $R_3$ of the resistor 28 are preferably equal and are chosen in accordance with the present invention to have a value such that the voltage output at the terminals 20 and 22 is a substantially linear function of the temperature being measured by the resistance temperature gage 12. More specifically, the value of the resistors 26 and 28 is chosen so that the output of the Wheatstone bridge 14 is a non-linear function of the resistance of the temperature gage 12 and more particularly deviates from a straight line function in a sense opposite to that in which the resistance vs. temperature characteristic of the resistance temperature gage 12 varies from a straight line and in an amount substantially to compensate therefor.

In order to determine the optimum value of the dummy resistors 26 and 28 it is necessary to analyze the Wheatstone bridge circuit 14 by which it can be shown that $$V = E\left[\frac{R_3}{R+R_3} - \frac{R_2}{R_1+R_2}\right] \quad \text{(Eq. 1)}$$

wherein:

V is the output voltage at the output terminals 20 and 22 when no load resistance is connected therebetween;
E is the voltage of the battery 30;
R is the value of the resistance of the resistance temperature gage 12 at the temperature being measured;
$R_1$ is the value of the fixed compensating resistor 24 and is equal to the value of R at the low end of the temperature range being measured;
$R_2$ is the value of the fixed resistor 26; and
$R_3$ is the value of the fixed resistor 28.

Assuming that $R_2$ is equal to $R_3$, Eq. 1 above can be rewritten in dimensionless form as follows:

$$V/E = \frac{R_2/R_1}{R/R_1+R_2/R_1} - \frac{R_2/R_1}{1+R_2/R_1} \quad \text{(Eq. 2)}$$

There is shown in FIG. 4 of the drawings a plot of Eq. 2 for the case wherein the resistance temperature gage 12 is a Baldwin T–14 or TB–14 gage or a Ruge PN–2 or BN–4 gage and further wherein $R_1$ is equal to the value of R at 70° F. For the sake of convenience "Relative Voltage" has been plotted against "Resistance Ratio," the Relative Voltage being the ratio of $V/E$ to its value at 350° F. which is the maximum operating temperature of the Baldwin gages, and the Resistance Ratio is the value of the Resistance R of the gage 12 at the temperature being measured divided by the value thereof at 70° F. Two curves have been plotted in FIG. 4, the upper curve being that case wherein $R_2$ is equal to $R_1$ or to the value of R at 70° F. and the lower curve being the case wherein $R_2$ is taken to be infinite wherein it will be seen that the relationship is a straight line function. Accordingly, for any finite value of the dummy resistors 26 and 28, the output voltage V of the Wheatstone bridge 14 is a non-linear function of the resistance R of the gage 12, this non-linearity being negative in character and in the opposite sense when compared with the non-linearity of the value R of the gage 12 versus temperature as illustrated in FIG. 3 of the drawings. Accordingly, by proper choice of the value of $R_2$, the non-linearity of the output of the Wheatstone bridge illustrated by the curve of FIG. 4 when combined with the non-linearity of the resistance change in response to changes in temperature of the temperature measuring gage illustrated by the curve of FIG. 3 serves substantially to cancel the non-linearity therebetween whereby to provide a substantially linear function for the relationship between the output voltage at the output terminals 20 and 22 and the temperature being measured by the resistance temperature gage 12. The effect of combining these two non-linearities is illustrated graphically in FIG. 5 of the drawings wherein the combined non-linearities have been plotted for three different values of the dummy resistors 26 and 28. When the ratio of the value $R_2$ of the dummy resistors to the value $R_{70}$ of the gage 12 at 70° F. is one, the compensation provided by the non-linearity of the Wheatstone bridge 14 is seen to be sufficient to more than counteract the non-linearity of the gage 12 with respect to temperature whereby to provide a deviation from a straight line curve in the same sense that the plot of Relative Voltage vs. Resistance Ratio of FIG. 4 deviates from a straight line curve. When the ratio between $R_2$ and $R_{70°}$ is infinite, there is not sufficient compensation by the Wheatstone bridge circuit and as a result the curve differs from a straight line function in the same sense that the plot of Resistance Ratio vs. temperature of FIG. 3 differs from a straight line function. On the other hand, when the ratio between $R_2$ and $R_{70°}$ is approximately 3, a substantially straight line function is obtained when the Relative Voltage is plotted against temperature as is indicated by the intermediate curve in FIG. 5. In this case the non-linearity introduced into the system by the Wheatstone bridge 14 is of the opposite sense and substantially equal in amount to the non-linearity of the gage response to temperature change whereby to compensate for the non-linearity of the resistance temperature gage 12 with respect to temperature so that the output voltage from the Wheatstone bridge circuit 14 is substantially linear with respect to temperature.

In order to determine the actual value in ohms of the dummy resistors 26 and 28 so that a linear output is obtained across the output terminals 20 and 22, it is necessary simultaneously to solve Equation 1 above and the relationship between the resistance of the temperature sensing gage 12 and the temperature being measured. This solution can be made only by trial and error methods, either by hand or by modern electronic computers. It is also possible by means of Equations 1 and 2 above to determine the actual non-linearity to be expected at the output terminals 20 and 22 when the optimum value of the resistors 26 and 28 is utilized in the Wheatstone bridge. In the trial and error method of calculation of the optimum value of the dummy resistors 26 and 28, it is necessary to select a particular value and using that value to solve Equation 1 above and to compare the voltages that would be obtained at several temperatures by the use of that value of the dummy resistors with the voltages that are exactly proportional to temperature change.

There is shown in Table I below a typical calculation to verify the optimum ratio between the value $R_2$ of the dummy resistors and the values $R_1$ and $R_{70°}$ of the compensating resistor and the resistance temperature gage 12, respectively.

Table I

| T, °F. | R. (ohms) | R+R₂ | $\frac{R}{R+R_2}$ | $\frac{V}{E}$ | $\frac{V}{V_{350°}}$ | $\frac{T-70}{280}$ | Diff. |
|---|---|---|---|---|---|---|---|
| 70 | 200 | 800 | .25000 | 0 | 0 | 0 | 0 |
| 100 | 215 | 815 | .26380 | .01380 | .1071 | .1071 | 0 |
| 125 | 228 | 828 | .27536 | .02536 | .1968 | .1964 | .0004 |
| 150 | 241 | 841 | .28656 | .03656 | .2837 | .2857 | −.0020 |
| 175 | 255 | 855 | .29825 | .04825 | .3744 | .3750 | −.0006 |
| 200 | 269 | 869 | .30955 | .05955 | .4621 | .4643 | −.0022 |
| 225 | 284 | 884 | .32127 | .07127 | .5530 | .5536 | −.0006 |
| 250 | 299.5 | 899.5 | .33296 | .08296 | .6437 | .6429 | .0008 |
| 275 | 315 | 915 | .34426 | .09426 | .7314 | .7321 | −.0007 |
| 300 | 331.5 | 931.5 | .35588 | .10588 | .8215 | .8214 | .0001 |
| 325 | 348 | 948 | .36709 | .11709 | .9085 | .9107 | −.0022 |
| 350 | 366 | 966 | .37888 | .12888 | 1.0000 | 1.0000 | 0 |

There is also calculated in Table I above the maximum voltage error which is listed in the last column under the heading "Diff.," wherein it will be seen that the maximum voltage error is −0.0022. This error is too small to be detected visually from FIG. 5 and in terms of temperature is equal to −0.6° F. This error in linearity is approximately the same as those due to error in the manufacturer's published value of $R_{70°}$ which accompanies each package of gages. For most temperature measurements, the deviation from a straight line of the output voltage from the Wheatstone bridge 14 can be ignored.

Table II below illustrates the calculations confirming the optimum ratio of $R_2$ to $R_1$ and $R_{70°}$ for a Ruge SN-1 gage wherein it is found that this optimum ratio is 4.8.

Table II

| T, °F. | $\frac{R}{R_1}$ | $\frac{R}{R_1}+4.8$ | $\frac{R/R_1}{R/R_1+4.8}$ | $\frac{V}{E}$ | $\frac{V}{V_{600°}}$ | $\frac{T-70}{530}$ | Diff. |
|---|---|---|---|---|---|---|---|
| 70 | 1 | 5.800 | .17241 | 0 | 0 | 0 | 0 |
| 100 | 1.095 | 5.895 | .18575 | .01334 | .0559 | .0566 | −.0007 |
| 150 | 1.260 | 6.060 | .20792 | .03551 | .1488 | .1509 | −.0021 |
| 200 | 1.437 | 6.237 | .23040 | .05799 | .2429 | .2453 | −.0024 |
| 250 | 1.626 | 6.426 | .25303 | .08062 | .3377 | .3396 | −.0019 |
| 300 | 1.828 | 6.628 | .27580 | .10339 | .4331 | .4340 | −.0009 |
| 350 | 2.042 | 6.842 | .29845 | .12604 | .5280 | .5283 | −.0003 |
| 400 | 2.272 | 7.072 | .32127 | .14886 | .6236 | .6226 | .0010 |
| 450 | 2.417 | 7.317 | .34399 | .17158 | .7188 | .7170 | .0018 |
| 500 | 2.779 | 7.579 | .36667 | .19426 | .8138 | .8113 | .0025 |
| 550 | 3.057 | 7.857 | .38908 | .21667 | .9077 | .9057 | .0020 |
| 600 | 3.351 | 8.151 | .41112 | .23871 | 1.0000 | 1.000 | 0 |

There is tabulated in the last column headed "Diff." the actual output voltage error which is a measure of the deviation of the actual function from the ideal straight line function set forth in the next to the last column. It will be seen that the maximum voltage error in the case is 0.0025 which corresponds to a temperature error of 1.3° F. This error in linearity is also approximately the same as those due to error in the manufacturer's published value of $R_{70°}$ which accompanies each package of gages and in general this deviation of the bridge output voltage from a straight line can be ignored in practical applications.

The above simultaneous solutions of Eq. 1 and the relationship of the gage resistance vs. temperature have been illustrated as performed by the "trial and error" method, but because of the complexity of the equations and relationships, the solution thereof can be better obtained by modern computer systems such as the International Business Machine 704.

The above calculated optimum values are for a given range of use of the resistance temperature gage. If the range of use is changed, then the optimum ratio of $R_2$ to $R_1$ also changes. For example, if the Ruge gage SN-1 is used over the temperature range 0° F. to 500° F. instead of the range 70° F. to 600° F. calculated above in Table II, the optimum ratio of $R_2$ to $R_1$ is 4.1 instead of 4.8. The maximum linearity deviation over the temperature range 0° F. to 500° F. is 1.57° F. Furthermore, by example, if the Baldwin gage TB-14 is utilized over the temperature range 32° F. to 212° F. instead of over the temperature range 70° F. to 350° F. illustrated in Table I above, the ratio of $R_2$ to $R_1$ is optimum at 3.05 instead of 3. The maximum linearity deviation in this case is 0.34° F.

Equations 1 and 2 above are those applicable when there is no load resistance connected across the output terminals 20 and 22. Frequently, a relatively low resistance load is desirable, for example, when a voltage divider is inserted in the output to provide a gain control for the indicating instrument. An output load in the form of a resistor 32 has been shown connected between the output terminals 20 and 22 in FIG. 2 of the drawings, the resistor 32 having a resistance value $R_L$. The effect of the finite load $R_L$ upon the output voltage can be determined by writing the three loop voltage equations, the first loop including the battery 30, the resistance gage 12, and the dummy resistor 28; the second loop including the battery 30, the compensating resistor 24, and the dummy resistor 26; and the third loop including the dummy resistor 26, the dummy resistor 28, and the load resistor 32. Three voltage equations can be written for these three loops as follows:

$$i_1 R + (i_1 - i_3) R_2 = E \qquad \text{(Eq. 3)}$$
$$i_2 R_1 + (i_2 + i_3) R_2 = E \qquad \text{(Eq. 4)}$$
$$(i_3 - i_1) R_2 + i_3 R_L + (i_3 + i_2) R_2 = 0 \qquad \text{(Eq. 5)}$$

wherein:

$i_1$ is the current through the first loop described above;
$i_2$ is the current through the second loop described $i_3$ is the current through the third loop described above;

R is the resistance value of the resistance temperature gage 12 at the temperature being measured;

$R_1$ is the fixed resistance value of the compensating resistor 24 and is equal to the value of R at the low end of the temperature range being measured;

$R_2$ is the value of the fixed resistors 26 and 28 which are equal;

E is the voltage of the battery 30.

Equations 3, 4 and 5 above can be solved simultaneously to yield $$\frac{V}{E} = \frac{i_3 R_L}{E} = \frac{\frac{R_2}{R+R_2} - \frac{R_2}{R_1+R_2}}{1 + 2\left(\frac{R_2}{R_L}\right) - \left(\frac{R_2^2}{R_L(R+R_2)}\right) - \left(\frac{R_2^2}{R_L(R_1+R_2)}\right)}$$

(Eq. 6)

The numerator of Equation 6 is the same as Equation 1 above when $R_2$ equals $R_3$ and therefore the denominator of Equation 6 is a measure of the linearity error introduced by the load resistance $R_L$. Specifically, the deviation from the unloaded output curve caused by the load resistance is the ratio of $V/E$ loaded, to $V/E$ when $R_L$ is infinite; i.e., $$\frac{\frac{V}{E}}{\left(\frac{V}{E}\right)_{R_L = \infty}} = \frac{V}{V_\infty} = \frac{1}{1 + 2\frac{R_2}{R_L} - \frac{R_2^2}{R_L(R+R_2)} - \frac{R_2^2}{R_L(R_1+R_2)}}$$

$$= \frac{1}{1 + 2\frac{R_2}{R_L} - \left(\frac{R_2}{R_L}\right)\left(\frac{R_2}{R_1}\right)\left(\frac{1}{\frac{R}{R_1} + \frac{R_2}{R_1}} + \frac{1}{1 + \frac{R_2}{R_1}}\right)}$$

(Eq. 7)

wherein:

$V_\infty$ is the value of the output voltage when the output load $R_L$ is infinite.

This deviation is plotted in FIG. 7 for several values of the ratio of $R_L$ to $R_2$ when the ratio of $R_2$ to $R_1$ is equal to 1. It will be seen that as the ratio between the load resistance $R_L$ and $R_2$ increases, the "droop," i.e., the departure of the output voltage from a horizontal line decreases so that when the resistance of the load is increased to 100 times $R_2$, the droop is only 0.14%. The maximum temperature error due to bridge loading is then 0.4° F. In FIG. 8 there is plotted the droop obtained when the ratio of $R_2$ to $R_1$ is the optimum value of 3. In this case it will be seen that if the load resistance $R_L$ is 100 times the dummy resistance $R_2$, then the droop is only 0.12% which corresponds to a maximum temperature error due to loading of the bridge of 0.3° F. The error due to loading will decrease still further as the load resistance 32 is increased.

The circuit of FIG. 2 can be used without further modifications to measure temperatures provided that the output voltage of the battery 30 is known precisely and further provided that the operator after reading the output voltage multiplies it by a suitable proportionality factor to convert to a temperature reading. However, the work of multiplication and the error due to the drift in the potential of the battery 30 can be avoided by the addition of calibrating resistors and suitable accompanying circuitry as illustrated in FIG. 6 of the drawings.

It further is desirable in a practical instrument to be able to adjust the reading of the meter or other indicating device so that the bottom end of the temperature range being measured corresponds to the zero scale position of the meter and so that the high end of the temperature range to be measured produces a full-scale reading on the meter. In order readily to calibrate the meter so as to correlate the output of the bridge to the scale divisions on the meter face, a circuit has been provided as illustrated schematically in FIG. 6, the same reference numerals being applied to the circuit of FIG. 6 as are applied to FIG. 2 where appropriate. It will be seen from FIG. 6 that one end of the resistance temperature gage 12 has been connected to the output terminal 20 but that the other end thereof has been connected to the third contact on a three position switch 34 which can selectively connect the first input terminal 16 to any of three desired positions or switch contacts. For purposes of illustration, a Baldwin TB–14 gage has been shown utilized as the resistance temperature gage 12 and it is connected in the bridge 14 for use over the temperature range 70° F. to 350° F. At 70° F., the resistor 12 has a resistance of 200 ohms and, accordingly, it is desirable that the bottom or zero end of the scale be adjusted for a resistance of 200 ohms at 70° F. To this end a calibrating resistor 36 has been provided having a resistance value $R_0$ of 200 ohms to correspond to the low end of the temperature scale. One terminal of the resistor 36 is connected to the output terminal 20 and the other terminal thereof is connected to the first position or first contact of the switch 34. Accordingly, when the movable contactor of the switch 34 contacts position 1, the low end calibrating resistor 36 is connected between the output terminal 20 and the input terminal 16.

In order to calibrate the full-scale or high reading of the instrument, a calibrating resistor 38 is provided which has a resistance $R_H$ equal to the resistance of the resistance temperature gage 12 at 350° F., this resistance being 366 ohms for a TB–14 gage. One terminal of the resistor 38 is connected to the output terminal 20 and the other terminal thereof is connected to the second position or second contact of the switch 34. The operator by placing the switch 34 in the second position thereof connects the high end calibrating resistor 38 between the output terminal 20 and the input terminal 16. The output from the bridge network now corresponds to that which will be obtained at the high end of the temperature range being measured or at 350° F. When using a TB–14 type resistance temperature gage 12 over the range of 70° F. to 350° F., the value $R_1$ of the resistor 24 is chosen to be 200 ohms whereby to correspond to the resistance of the gage 12 at the low end of the range to be measured or at 70° F. The value of the fixed dummy resistors 26 and 28 is computed as in Table I above and is found to be preferably three times the value of the gage resistance R at 70° F. or three times 200 ohms which is 600 ohms. When the resistors have these values, the output voltage from the bridge circuit 14 will be substantially a straight line function of temperature over the range being measured, namely, 70° F. to 350° F.

The output terminal 20 is connected by a lead 40 to one of the input terminals of a variable gain amplifier 42 and the other output terminal 22 of the bridge 14 is connected through a lead 44 to a second input terminal of the amplifier 42. The amplifier 42 is in turn connected through leads 46 and 48 to an indicator or a recorder. In order to calibrate the instrument, the operator may first place the switch 34 in position 1 whereby to connect the resistor 36 having a value of 200 ohms between the output terminal 20 and the input terminal 16 in which position the output from the bridge circuit 14 will be zero. Accordingly, the indicator or recorder connected to the lines 46—48 can then be adjusted to the zero position thereof.

Next the operator places the switch 34 in the second position whereby to connect the resistor 38 between the output terminal 20 and the input terminal 16. The output from the bridge circuit 14 will now correspond to the output at the high end of the temperature range being measured or at 350° F. The gain of the amplifier 42 is adjusted whereby to give a full-scale reading for this output from the bridge circuit 14. The measuring device is made ready for use by placing the switch 34 in the third position whereby to connect the temperature sensing resistor 12 between the input terminal 16 and the output terminal 20. The voltage appearing on the lines 46—48 will be directly proportional to the temperature being sensed by the resistance temperature gage 12 and will cause an indication on the indicator or recorder which is substantially directly proportional to the temperature being sensed by the gage 12.

The principles of the circuits of FIGS. 2 and 6 can be readily incorporated into a practical instrument, the structure of such an instrument being illustrated in FIG. 1 of the drawings and the schematic electrical diagram of such an instrument being illustrated in FIG. 9 of the drawings. Referring first to FIG. 9 of the drawings, it will be seen that a bridge circuit 14 has again been provided having the input terminals 16 and 18 and the output terminals 20 and 22. The compensating resistor 24 is connected between the output terminal 22 and one terminal on a banana jack 50 and particularly to the terminal 52 thereof. The second terminal 54 of the jack 50 is connected to the input terminal 16 and may also be connected to the jack terminal 52 either by a removable jumper 56 or a pair of lead wires 58 and 60 which connect with the terminals 52 and 54, respectively, at one end thereof and are connected to each other and to one terminal of the resistance temperature gage 12 at the other end thereof. By these connections the compensating resistor 24 is in effect connected between the output terminal 22 and the input terminal 16 of the bridge circuit 14. The dummy resistors 26 and 28 are connected precisely as has been described above. The battery 30 is connected between the input terminals 16 and 18 in series with an "Off-On" switch 62 labeled "Batt" in FIG. 1.

A three position switch 64 is provided selectively to connect the output terminal 20 to one of three resistors, namely, the minimum scale reading calibrating resistor 66, the maximum scale reading calibrating resistor 68, or the resistance temperature gage resistor 12. More specifically, the switch 64 has a movable switch arm 70 which is suitably connected at all times to the output terminal 20 and can be shifted to make contact with any of three contacts in three corresponding positions thereof. The first contact 72 has been designated as the "Min." position and, when the switch 64 is in that position, it serves to connect the calibrating resistor 66 between the input terminal 16 and the output terminal 20. The second contact 74 of the switch 64 has been designated as the "Max." position and is connected to the calibrating resistor 68 whereby, when the arm 70 is in position to connect with the contact 74, the high end calibrating resistor 68 is connected between the input terminal 16 and the output terminal 20. The third contact 76 on the switch 64 is designated as the "Read" position and is connected by a line 78 to the third terminal 80 on the banana jack 50. The other end of the resistance temperature gage 12 is connected through a line 82 to the terminal 80. Accordingly, when the switch arm 70 is against the contact 76, the resistance temperature gage 12 is connected between the input terminal 16 and the output terminal 20.

The output terminal 20 is connected to a line 84 which connects with a fixed load resistor 86 which is in series with the resistance element of a potentiometer 88 having a movable contact arm 90 in contact therewith. The contact arm 90 connects with a terminal of an ammeter 92 which is in turn connected through a line 94 and a pair of contacts 96 on a phone jack 100 to a line 98 connected to the other output terminal 22. In certain instances it is desirable to utilize an external recorder and therefore the instrument is provided with the phone jack 100 which is connected to a potentiometer 102 whereby the insertion of a plug in the phone jack 100 serves to disconnect the ammeter, and to connect the resistance element of the potentiometer 102 directly across the output terminals 20 and 22 and serves to provide a connection from the movable contact arm 104 on the potentiometer 102 to one terminal of an external high-impedance meter or recorder, the other terminal of which is connected to the output terminal 22.

In the meter illustrated in FIGS. 1 and 9 of the drawings the component parts have been selected to use a TB-14 resistance temperature gage as the temperature sensing element 12 in FIG. 9, the instrument to be used over the temperature range 20° C. to 120° C. This will permit the use of a scale on the indicating instrument having 100 divisions whereby to obtain a direct reading of the temperature. The particular resistance temperature gage 12 utilized has a resistance at 20° C. of 200 ohms and a resistance at 120° C. of 299.5 ohms. Accordingly, the compensating resistor 24 has a value of 200 ohms, the dummy resistors 26 and 28 have a value of 600 ohms (three times the value of the compensating resistor 24 and the resistance of the gage 12 at the low end of the scale or 20° C.); the calibrating resistance 66 has a value of 200 ohms corresponding to the low scale reading; the calibrating resistor 68 has the value of 299.5 ohms corresponding to the high end of the temperature range to be measured. The fixed load resistor 86 has a value of 6800 ohms and the potentiometers 88 and 102 have a value of 25,000 ohms. The ammeter 92 has a scale of zero to 100 microamperes and has the face thereof calibrated from zero to 100 as is illustrated in FIG. 1.

In using the instrument, the operator first turns on the switch 62 whereby to connect the battery 30 between the input terminals 16 and 18 of bridge 14. He then turns the switch 64 to the "Min." position whereby to place the arm 70 against the contact 72 and thereby to connect the low end calibrating resistor 66 in the bridge circuit. At this point there should be zero output at the terminals 20—22 and, accordingly, the pointer on the meter 92 is adjusted with the "zero adjust" mechanism 120 (see FIG. 1 of the drawings) so that the pointer is on the zero mark. The switch 64 is then placed in the "Max." position whereby to connect the high-scale calibrating resistor 68 in the bridge. Maximum output from the bridge is now obtained and the potentiometer 88 is adjusted so that the gain of the circuit will provide a full scale reading of the meter 92, i.e., the pointer is adjusted to the "100" mark. By placing the switch 64 in the "Read" position, the instrument will indicate directly on the face of the microammeter 92 the difference between 20° C. and the temperature to which the gage 12 is subjected. Accordingly, by simply adding 20 to the reading on the scale of the ammeter 92, the temperature is directly ascertainable.

If the gage 12 is connected to long leads 58, 60 and 82 which also have small diameters, changes in the resistance of these leads may be large enough to cause significant errors in the temperature measurements. This error can be reduced by opening one corner of the bridge by removing the jumper 56 from between the jack terminals 52 and 54. This provides the usual three-wire connection to compensate for such lead resistance.

In building the actual instrument or measuring device 10, the usual casing 110 is provided in which are mounted the ammeter 92, the fixed load resistor 86, the potentiometers 88 and 102, the battery 30, the "Off-On" switch 62 which may also be conveniently labeled "Batt." on the casing 110, the banana jack 50, the phone jack 100, and the switch 64. In order to achieve flexibility in the use of the above named parts of the meter 10, the resistors 24, 26, 28, 66 and 68, which must be changed when using different types of gages 12, are mounted in a subassembly within a housing 114 which is removably connected to the casing 110 by suitable plug-in connectors. This arrangement provides for a quick change of temperature ranges and a quick change of gages 12 if desired while utilizing the same basic components and particularly the same ammeter 92. By providing a plurality of the housings 114 with different combinations of fixed resistances therein, the meter 10 can be readily converted for use with different gages 12 and over different temperature ranges for the gages.

In view of the foregoing, it is apparent that there has been provided an improved measuring device and particularly an improved linearized temperature measuring device. While there has been described what is at present considered to be a certain preferred embodiment of the invention, it will be understood that various modifications may be made therein, and it is intended to cover in the appended claims all such modifications as fall within the true spirit and scope of the invention.

What is claimed is:

1. A device for measuring throughout a predetermined range a variable control condition C of linear character; said device comprising a circuit mesh including first and second input terminals, first and second output terminals, a sensing resistor subjected to the control condition C and connected between said first input terminal and said first output terminal said sensing resistor having a variable resistance R which constitutes a non-linear function within the predetermined range of the control condition C and which deviates in a given sense from a straight-line function, a first fixed resistor having a fixed resistance $R_1$ and connected between said first input terminal and said second output terminal, a second fixed resistor having a fixed resistance $R_2$ and connected between said second input terminal and said second output terminal, a third fixed resistor having a fixed resistance $R_3$ and connected between said second input terminal and said first output terminal, a source of potential having a value E and connected between said first and second input terminals, whereby:

$$V = E\left[\frac{R_3}{R+R_3} - \frac{R_2}{R_1+R_2}\right]$$

where:

V is the output potential between said first and second output terminals, and wherein:

the resistance $R_1$ is equal to the resistance R at one end of the predetermined range of the control condition C, the resistance $R_2$ is equal to the resistance $R_3$, and the resistance $R_2$ has a value such that the output potential V is a non-linear function of the resistance R within the predetermined range of the control condition C and deviates from a straight-line function in a sense opposite to and in an amount substantially equal to said first mentioned deviation, whereby the output potential V is a substantially linear function within the predetermined range of the control condition C, and means for producing a substantially linear indication of the output potential V as a measurement of the value within the predetermined range of the control condition C.

2. A device for measuring throughout a predetermined range a variable temperature T of linear character; said device comprising a circuit mesh including first and second input terminals, first and second output terminals, a sensing resistor subjected to the temperature T and connected between said first input terminal and said first output terminal, said sensing resistor having a variable resistance R which constitutes a non-linear function within the predetermined range of the temperature T and which deviates in a given sense from a straight-line function, a first fixed resistor having a fixed resistance $R_1$ and connected between said first input terminal and said second output terminal, a second fixed resistor having a fixed resistance $R_2$ and connected between said second input terminal and said second output terminal, a third fixed resistor having a fixed resistance $R_3$ and connected between said second input terminal and said first output terminal, a source of potential having a value E and connected between said first and second input terminals, whereby:

$$V = E\left[\frac{R_3}{R+R_3} - \frac{R_2}{R_1+R_2}\right]$$

where:

V is the output potential between said first and second output terminals, and wherein:

the resistance $R_1$ is equal to the resistance R at one end of the predetermined range of the temperature T, the resistance $R_2$ is equal to the resistance $R_3$, and the resistance $R_2$ has a value such that the output potential V is a non-linear function of the resistance R within the predetermined range of the temperature T and deviates from a straight-line function in a sense opposite to and in an amount substantially equal to said first mentioned deviation, whereby the output potential V is a substantially linear function within the predetermined range of the temperature T, and means for producing a substantially linear indication of the output potential V as a measurement of the value within the predetermined range of the temperature T.

3. A device for measuring throughout a predetermined range a variable temperature T of linear character; said device comprising a circuit mesh including first and second input terminals, first and second output terminals, a sensing resistor subjected to the temperature T and connected between said first input terminal and said second output terminal, said sensing resistor having a positive temperature coefficient of resistance so that it has a variable resistance R which constitutes a non-linear function within the predetermined range of the temperature T and which deviates in a given sense from a straight-line function, a first fixed resistor having a fixed resistance $R_1$ and connected between said first input terminal and said first output terminal, a second fixed resistor having a fixed resistance $R_2$ and connected between said second input terminal and said second output terminal, a third fixed resistor having a fixed resistance $R_3$ and connected between said second input terminal and said first output terminal, a fourth fixed resistor having a fixed resistance $R_L$ and connected between said first and second output terminals, a source of potential having a value E and connected between said first and second input terminals, whereby:

$$V = E\left[\frac{\frac{R_2}{R+R_2} - \frac{R_2}{R_1+R_2}}{1 + 2\left(\frac{R_2}{R_L}\right) - \left(\frac{R_2^2}{R_L(R+R_2)}\right) - \left(\frac{R_2^2}{R_L(R_1+R_2)}\right)}\right]$$

where:

V is the output potential between said first and second output terminals, and wherein:

the resistance $R_1$ is equal to the resistance R at one end of the predetermined range of the temperature T, the resistance $R_2$ is equal to the resistance $R_3$, the resistance $R_L$ is substantially greater than the resistance $R_2$, and the resistance $R_2$ has a value such that the output potential V is a non-linear function of the resistance R within the predetermined range of the temperature T and deviates from a straight-line function in a sense opposite to and in an amount substantially equal to said first mentioned deviation, whereby the output potential V is a substantially linear function within the predetermined range of the temperature T, and means for producing a substantially linear indication of the output potential V as a measurement of the value within the predetermined range of the temperature T.

4. The temperature measuring device set forth in claim 3, wherein the value of the resistance $R_L$ is approximately at least ten times the value of the resistance $R_2$.

References Cited in the file of this patent

UNITED STATES PATENTS

| | | |
|---|---|---|
| 955,191 | Northrup et al. | Apr. 19, 1910 |
| 1,361,676 | Brewer | Dec. 7, 1920 |
| 1,460,530 | Brown et al. | July 3, 1923 |
| 2,040,285 | Tietz et al. | May 12, 1936 |
| 2,749,753 | Adams | June 12, 1956 |

FOREIGN PATENTS

| | | |
|---|---|---|
| 630,638 | Great Britain | Oct. 18, 1949 |

OTHER REFERENCES

Beakley: "The Design of Thermistor Thermometers With Linear Calibration," Journal of Scientific Instruments, vol. 28, June 1951, pp. 176–179. (Copy in Sci. Library U.S. Patent Office.)

Goodwin: "Design of Simple Resistance Thermometer Bridges for Wide-Range Control of Low Temperatures," Review of Scientific Instruments, vol. 29, June 1958, pp. 497–501. (Copy in Scientific Library.)

Delafond: "Thermometre Electrique a Distance par la method du Pont, de Wheatstone desequilibre," Measures, September 1955, No. 220, pp. 607–609. (Copy in Scientific Library.)

UNITED STATES PATENT OFFICE
CERTIFICATE OF CORRECTION

Patent No. 3,060,743            October 30, 1962

Donald R. Mack

It is hereby certified that error appears in the above numbered patent requiring correction and that the said Letters Patent should read as corrected below.

Column 12, line 28, for "second" read -- first --; line 29, for "put" read -- output --; line 35, for "first", second occurrence, read -- second --.

Signed and sealed this 16th day of April 1963.

(SEAL)
Attest:

ERNEST W. SWIDER
Attesting Officer

DAVID L. LADD
Commissioner of Patents